(12) United States Patent
Taneja et al.

(10) Patent No.: US 10,038,667 B2
(45) Date of Patent: Jul. 31, 2018

(54) METHOD AND SYSTEM OF AUTHENTICATION AND OTA REGISTRATION OF A NEW USER WITHOUT A SIM CARD IN MULTI-OPERATOR MOBILE TELEPHONY

(71) Applicant: Infosys Limited, Bangalore (IN)

(72) Inventors: Amit Taneja, Torrance, CA (US); Peeyush Singhal, Pune (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 15/346,611

(22) Filed: Nov. 8, 2016

(65) Prior Publication Data
US 2017/0135059 A1    May 11, 2017

(30) Foreign Application Priority Data

Nov. 9, 2015   (IN) .......................... 6044/CHE/2015

(51) Int. Cl.
| | | |
|---|---|---|
| *H04L 29/12* | (2006.01) | |
| *H04W 12/06* | (2009.01) | |
| *H04L 29/08* | (2006.01) | |

(52) U.S. Cl.
CPC ........ *H04L 61/6054* (2013.01); *H04L 67/303* (2013.01); *H04W 12/06* (2013.01); *H04L 61/10* (2013.01); *H04L 61/605* (2013.01)

(58) Field of Classification Search
CPC . H04L 61/6054; H04L 67/303; H04L 61/605; H04L 61/10; H04W 12/06
See application file for complete search history.

(56) References Cited

U.S. PATENT DOCUMENTS

| | | | |
|---|---|---|---|
| 8,532,706 B2 | 9/2013 | Kaul | |
| 8,630,614 B2 | 1/2014 | Korkiakoski et al. | |
| 2007/0165844 A1* | 7/2007 | Little | G06F 21/6245 380/30 |
| 2009/0077643 A1 | 3/2009 | Schmidt et al. | |
| 2009/0125996 A1* | 5/2009 | Guccione | H04L 63/0853 726/6 |
| 2012/0108205 A1* | 5/2012 | Schell | H04W 4/001 455/411 |
| 2012/0108295 A1* | 5/2012 | Schell | H04W 4/001 455/558 |
| 2012/0246481 A1 | 9/2012 | Guccione et al. | |
| 2013/0303122 A1* | 11/2013 | Li | H04W 8/20 455/411 |
| 2014/0101449 A1* | 4/2014 | Trujillo Gonzalez | H04W 8/183 713/171 |

(Continued)

*Primary Examiner* — Nathan Mitchell
(74) *Attorney, Agent, or Firm* — Klarquist Sparkman, LLP

(57) ABSTRACT

In a preferred aspect of the present invention there is disclosed method of authentication and over-the-air (OTA) registration of a new user without a subscriber identity module (SIM) card, comprising the steps of transmitting a set of first time registration parameters to a selected service provider by a user device. In response the user device receives a notification to initiate a captive environment for the new user registration. The service provider is provided with a set of temporary session parameters and a temporary key which then validates a set of registration parameters provided by the user. Subsequently storing, at the user device, a set of permanent user profile parameters in a user profile module.

22 Claims, 3 Drawing Sheets

(56) References Cited

U.S. PATENT DOCUMENTS

| | | | | |
|---|---|---|---|---|
| 2014/0179296 A1* | 6/2014 | Cai | ....................... | H04W 8/205 |
| | | | | 455/418 |
| 2015/0350881 A1* | 12/2015 | Weiss | .................... | H04W 4/001 |
| | | | | 455/558 |
| 2016/0007190 A1* | 1/2016 | Wane | .................... | H04M 15/63 |
| | | | | 455/419 |

* cited by examiner

METHOD AND SYSTEM OF AUTHENTICATION AND OTA REGISTRATION OF A NEW USER WITHOUT A SIM CARD IN MULTI-OPERATOR MOBILE TELEPHONY

FIELD

The field relates to over-the-air registration of mobile devices in wireless networks.

BACKGROUND

New users of mobile devices, including mobile phones, tablets, and the like, can register and activate their mobile devices with a wireless network in several ways. One manner of registering a mobile device with a wireless network is to procure a subscriber identity module (SIM) card module from a service provider or purchase or receive a mobile device with a virtual SIM module built in, and have the service provider enter activation data into the wireless network related to the individual and the mobile device identification. In this manner, when the user begins to use the mobile device, the wireless network will recognize the user and mobile device to enable the user to make calls and communicate data. In one embodiment, the communication between the user device and the service provider is carried over a radio channel or a data channel.

The foregoing procedure is used in the global system for mobile communication (GSM) system. In a GSM system, an international mobile subscriber identity (IMSI) is fixed in a subscriber identity module (SIM) and the carrier's system records the mobile identification which is reported by the wireless device after the attachment or registration process is completed.

Another method of enabling a user to register and activate a mobile device with a wireless network is through over-the-air activation (OAA). In this method, when a mobile device is first used, it identifies itself to the wireless network using temporary identification data stored on the wireless device.

The telecommunication service industry has long been dependent on the use of a SIM card as primary source of user authentication on the network. However, with radical evolution in technology in telecom space the need for use of SIM card also needs to be challenged. The traditional method for user authentication and connection to Network via SIM card is becoming increasingly challenging owing to the drivers for change as discussed previously. Due to this there lies a potential to evolve the current way of user authentication and SIM related Network tied connectivity.

SUMMARY

This document covers solutions in space of evolving the virtual SIM application that will do away with current need to have a SIM based user registration process. The proposed solution relies on over-the-air (OTA) user network authentication and registration without SIM card. The benefits realization due to this change affects the entire ecosystem comprising of the users, service providers, OEM & OS providers and regulators in telecommunication space in a positive manner.

In one aspect of the present invention there is disclosed method of authentication and OTA registration of a new user without a SIM card, comprising the steps of transmitting a set of first time registration parameters to a selected service provider by a user device. In response the user device receives a notification to initiate a captive environment for the new user registration. The captive environment is established over a secure channel between the user device and the service provider. The service provider is provided with a set of temporary session parameters and a temporary key which then validates a set of registration parameters provided by the user. Subsequently storing, at the user device, a set of permanent user profile parameters in a user profile module.

In another aspect there is disclosed a system of authentication and OTA registration of a new user without a SIM card, comprising a user device configured to transmit a set of first time registration parameters to a selected service provider and to receive a notification to initiate a captive environment for the new user registration over a secure channel. The secure channel may be one of an encrypted data channel, a VPN or any other mode of secure communication. The system further comprises a service provider configured to receive a set of temporary session parameters and a temporary key and validate a set of registration parameters provided by the user. The user device is also configured to store a set of permanent user profile parameters in a user profile module.

In yet another aspect of the invention the user device comprises a network selection engine to enable selection from a set of available networks and a first time user request module configured to store the set of first time user registration parameters.

In further another aspect the first time registration parameters comprises at least a registration-IMSI.

In yet another aspect the registration-IMSI is characterized to be identified as a new user registration parameter by the service provider.

One more aspect describes an authentication engine operatively coupled to the service provider transmits a set of captive session initiation parameters to the user device.

A further aspect describes a set of authentication parameters are generated using the captive session initiation parameters.

In one more aspect a home location register comprises a database configured to store the first time registration parameters.

In a further aspect the home location register is configured to transmit the authentication parameters to the mobile switching center (MSC).

In another aspect the mobile switching center (MSC) is configured to transmit temporary user profile to the user device.

In one more aspect the communication between the user device and the service provider is carried over one of a radio channel and a data channel.

In one more aspect the captive environment is established over a secure channel between the user device and the service provider.

In another aspect the user device comprises at least one of a virtual SIM module, an e-SIM module and a conventional SIM module or a combination thereof.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DETAILED DESCRIPTION

Figure 1:
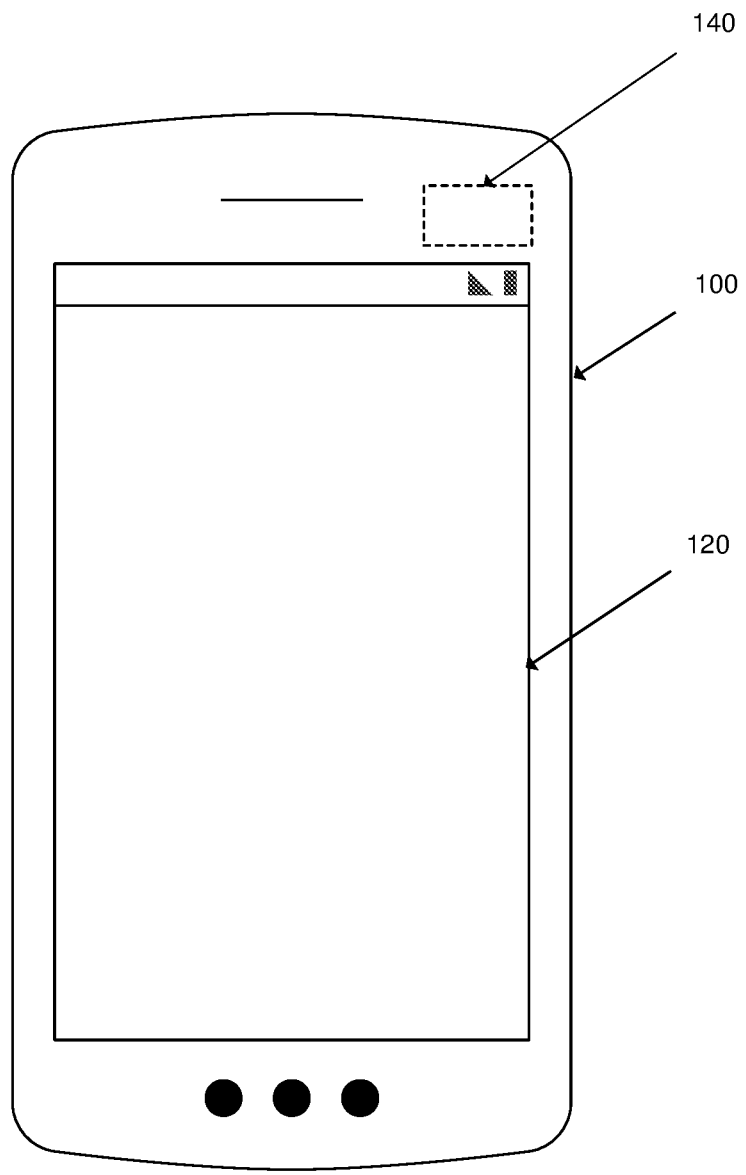
FIG. 1 illustrates an exemplary mobile device.

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The method steps have been represented, wherever appropriate, by conventional symbols in the drawings, showing only those specific details that are pertinent to understanding the embodiments of the present invention so as not to obscure the disclosure with details that will be readily apparent to those of ordinary skill in the art having benefit of the description herein.

The features of the present invention are set forth with particularity in the appended claims. The invention itself, together with further features and attended advantages, will become apparent from consideration of the following detailed description, taken in conjunction with the accompanying drawings.

FIG. 1 illustrates an exemplary mobile device, such as a smart phone. Smart phones in this context include devices using operating software of the iPhone®, the Android® operating system (also referred to as Droid®), the Symbian® operating system, software based on Linux® and others. Mobile devices in the present context need not have phone capabilities, nor need they include video camera capabilities. Further representative examples of mobile devices include without limitation Tablet computing devices, image and video playing devices, mobile computing devices with a keyboard, touchscreen, image recognizer, voice input, or other user input means, audio and video players, and so forth. The device may include one or more sensors such as a vibration sensors, an accelerometer, one or more magnetic sensors, a gyroscopic sensor, additional audio sensors or transducers, and so forth. A touch screen 120 is provided for touch input and display in the exemplary mobile device. A Subscriber Identification Module (SIM), 140 is placed inside the mobile device. The SIM maybe a physical SIM card, a virtual or e-SIM or any other adaptation of the traditional SIM. In a mobile communication system, an international mobile subscriber identity (IMSI) is fixed in a subscriber identity module (SIM). The SIM is also used to store subscriber-specific information, such as the international mobile station identity (IMSI) and an authentication key. The SIM comprises a non-volatile memory hereinafter referred as first time user request module which stores, but not limited to, the following information (registration parameters)—registration-IMSI (R-IMSI), Authentication algorithm A3, Cipher key generation algorithm A8 and Stream cipher Algorithm A5, GSM Hyper frame number.

Figure 2:
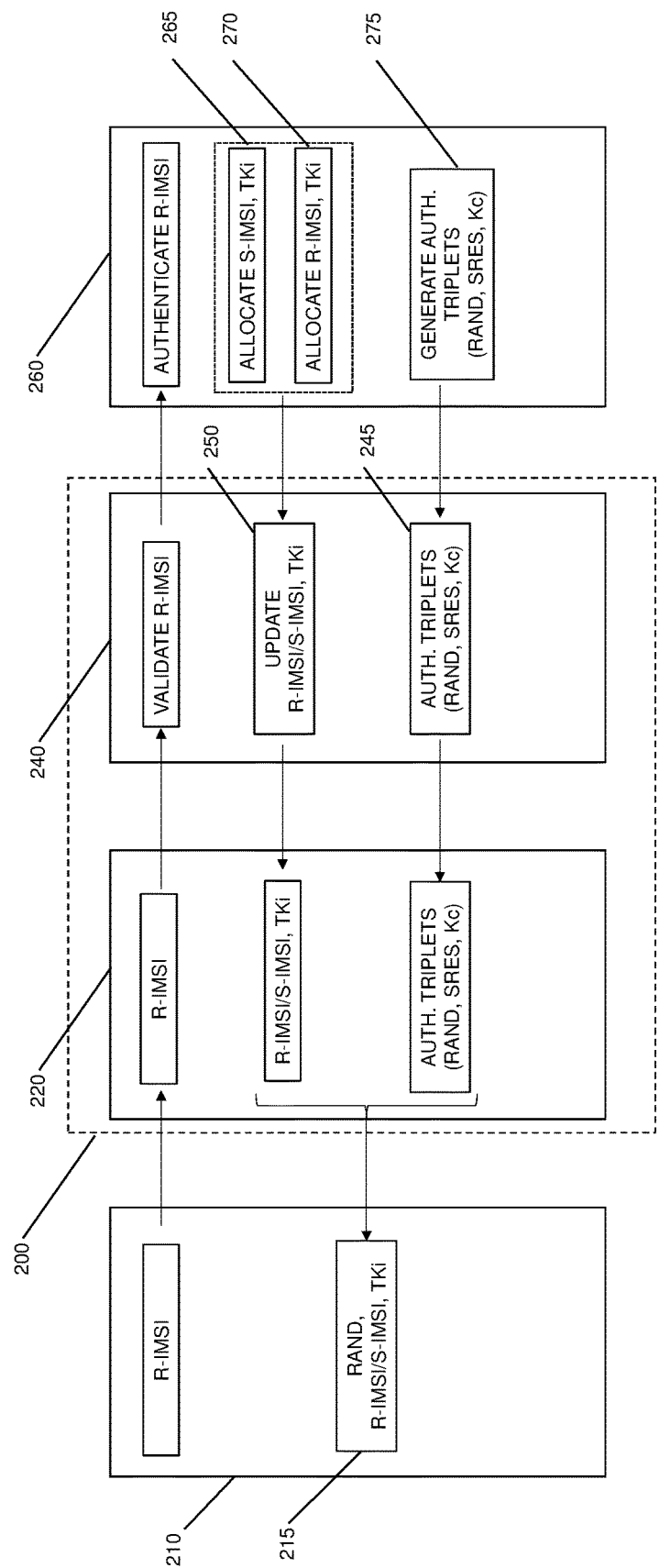
FIG. 2 illustrates a preferred process flow of the invention.

FIG. 2 relates to the method, 280, in which the technique is implemented using at least a user mobile device, 210, described above, and operatively coupled to a service provider, 200. A user invokes a network selection process using a network selection wizard to select a network operator/service provider of his choice. In case of a first time network registration request, the operating system in the user device interacts with the SIM which holds registration parameters of the user and transmits these parameters over the air (OTA) to the selected service provider. In one embodiment an embedded-SIM (e-SIM) module comprises at least a memory referred as user profile module for storing the permanent user profile parameters from service provider. The user profile module is also configured to overwrite a temporary session user profile parameters with the permanent user profile parameters. The e-SIM module is configured to store at least a new first time user registration parameter Registration-IMSI, hereinafter referred as R-IMSI. In case of multiple network connections is requested by the user, multiple user profile modules will be provided for storing multiple user profiles and corresponding R-IMSIs.

The R-IMSI is characterized in that it has similar digits/character length as a traditional IMSI. Unique combination of the digits in R-IMSI signifies that it is a first time user activation request. The unique combination as described herein is made available to the service provided which is pre-configured to identify and process the R-IMSI presented to it. Network access request in the form of R-IMSI is transmitted to the Service provider. Mobile switching center 220 which forms part of the service provider further routes the request to the home location register (HLR) 240.

In yet another preferred embodiment of present technique of the invention that the R-IMSI is standardized and recognized across the world amongst all the service providers, regulators by standard body such as ITU. For example, first three digits may indicate country code, subsequent three digits may indicate it's a first time registration request etc. Standardizing the R-IMSI across the service providers will ensure that the user is free to choose any network of his choice and open avenues for open connectivity.

In one embodiment, HLR and other network elements verify, using the digits in R-IMSI to identify a request as a first time activation request or existing registered user request. The HLR comprises a database of registration request parameters and is further configured to validate the transmitted R-IMSI against the registration request parameters to identify a registration request as one for a new connection. Post validation of the registration request HLR transmits the R-IMSI to an authentication center (AuC) 260.

The Authentication Center (AuC) is a protective database that stores the Ki, the A3 authentication algorithm, the A5 ciphering algorithm and the A8 ciphering key generating algorithm. It is configured to generate the sets of random numbers (RAND), Signed Response (SRES) and the Cipher key (KC), though the generated sets are stored in the HLR and VLR.

In one embodiment of this invention, authentication Center (AuC) is configured to store information such as Temporary Session-IMSI and Temporary Session Key (TKi) in addition to the standard information as per the current specifications.

In another embodiment the authentication center may be a part of the service provider. Alternative embodiments of the invention may allow the authentication center to be present as a separate module or entity. Further embodiment of the invention allows Authentication center to be a third party database operatively coupled to the HLR to provide authentication related services.

In yet another embodiment, AuC allocates a temporary session IMSI (S-IMSI) and temporary session Key TKi (245) and maps it to R-IMSI. S-IMSI and Ki are also mapped to a fixed balance temporary MSISDN. Another embodiment proposes that R-IMSI. S-IMSI and Ki are mapped to a Zero balance temporary MSISDN. The S-IMSI and TKi are then transmitted to the HLR where the HLR database is updated to store this information In an alternative embodiment, AuC allocates an R-IMSI with a temporary session key TKi (270). RIMSI and Ki are mapped to Zero balance temporary MSISDN or a fixed balance MSISDN. The R-IMSI and TKi are then transmitted to the HLR where the HLR database is updated to store this information In an additional embodiment, AuC is configured to generate authentication triplets (275) RAND, SRES, Kc using existing A3 and A8 algorithms and combination of either (S-IMSI, TKi) or (T-IMSI, TKi). Upon generation the AuC is configured to send response containing authentication triplets, 245, to the HLR which transmits the same to the Mobile switching center (MSC).

In another embodiment, the MSC is configured to store the SRES and Kc and transmit (215) RAND, R-IMSI/S-IMSI, TKi to the mobile device. The mobile device stores the temporary user profile information comprising of, but not limited to RAND, R-IMSI/S-IMSI, and TKi in the user profile module to enable user registration. Subsequent steps in user registration over the air involves that the mobile device transmits SRES and Kc that is generated using the R-IMSI/S-IMSI, TKi as inputs to A3 and A8 algorithms which are comprised within the AuC. Radio signaling and data are encrypted using A5 algorithm . . . . Encryption of signaling and transmission happens between User device and Mobile switching center. After authentication, Base Station sends signal to user device indicative of which A5 algorithm to use.

The MSC/VLR compares the SRES and Kc generated by the AuC with a SRES and a Kc generated by the user device. If they match, then authentication is completed successfully. Network signaling is established as per current standards. T-IMSI and Location Area Identity (LAI) update is done as per current network authentication process.

As a subsequent step of the successful authentication, the user is notified using, but not limited to, USSD, incoming customer care call or SMS that he needs to do his account registration to use his service.

In a further embodiment, user may initiate registration using any of the following channels—Web Registration, App. based Registration, Customer care call/IVR and USSD registration. A temporary session is made available to the user for a fixed time frame, as predefined by the service provider. The temporary session comprises a captive environment being provided to the user to complete the registration process. This captive environment is established over a secure channel of communication as provided to the user by the service provider. Upon successful registration Ki and IMSI are generated specific to the subscriber and are validated by OTP send over SMS/Email or any other preferred mode. The IMSI and Ki are stored into the e-SIM. The user provisioning is completed once the IMSI and Ki are updated at the mobile device and normal network authentication and signaling is used for subsequent communication with the service provider. In case of successful registration, user is notified via SMS, customer care call etc. that he can now use network of the service provider. In one more embodiment, multiple user profiles comprising Ki and IMSI can be stored in the customer profile module of the e-SIM module. User can select a default network in case of multiple profiles. The user is also provided an option to login or logout of the current network and logon to another using a set unique login credentials provided to the user from the respective service provider.

In an embodiment where the user selects the USSD based method of registration, the user is presented with relevant information to complete the registration using his mobile device. The mobile device displays the set of options that are available for the particular user.

Figure 3:
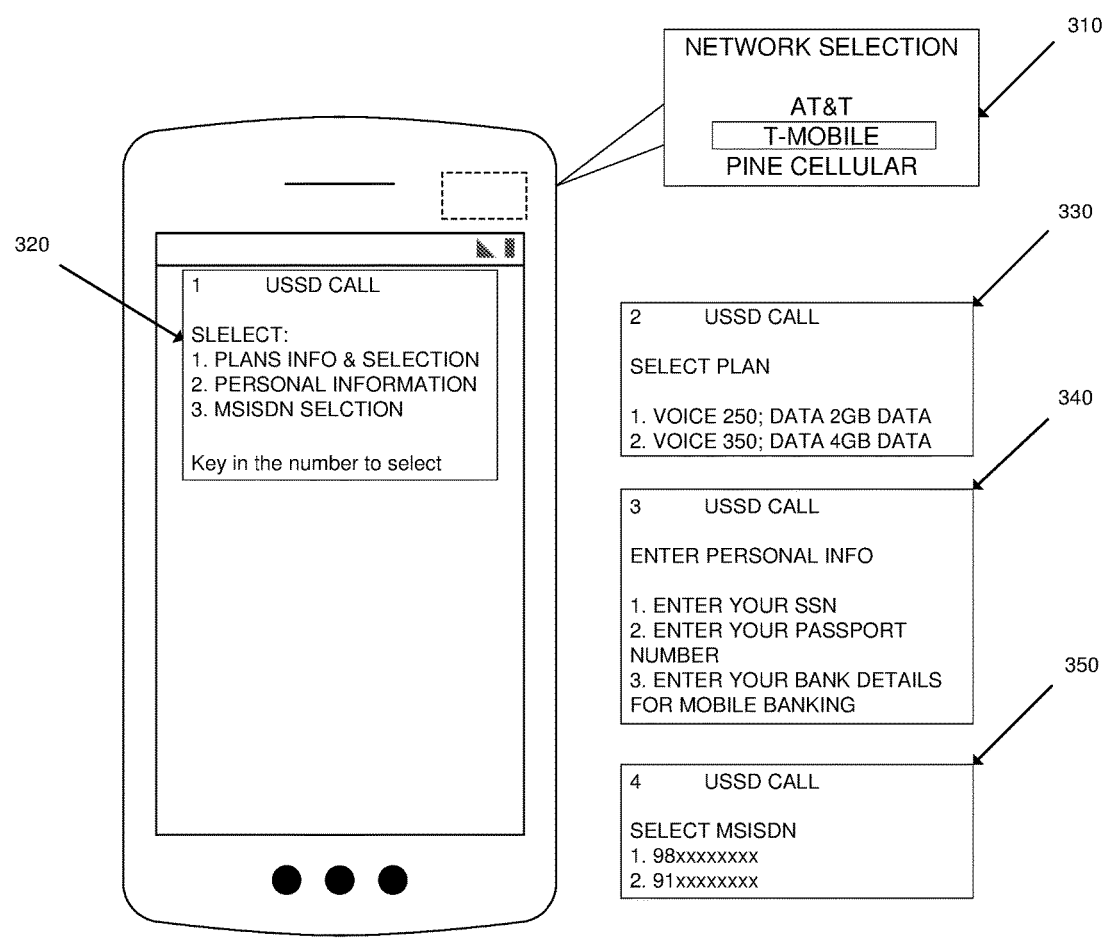
FIG. 3 illustrates an exemplary set of options made available to a user during registration.

In one of the embodiments, a sample set of information made available to the user is displayed in FIG. 3. The user is presented with a selection of service providers available (310). Upon selection of a preferred service provider, the user is presented with other details required to complete the information as depicted in 320. Based on the user selecting options 1-3, the user is presented with information as shown in 330-350 respectively on the display of the user device.

In another embodiment the service provider is interfaced with a third party or utility vendors to validate the registration details such as banks, government institutions, credit unions, electricity company etc. as is provided by the user. In an alternative embodiment, the service provider comprises a validation database linked to the third party or utility vendor to enable validation of user registration details.

In yet another embodiment the service provider sends a notification of successful or unsuccessful registration to the user. In case of unsuccessful registration, the user is presented with an option to re-enter the details that was incorrectly entered.

Any of the methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of authentication and over-the-air (OTA) registration of a new user without a subscriber identity module (SIM) card, comprising:

transmitting, by a user device, a set of first time registration parameters to a selected service provider;

validating, by the service provider, the set of first time registration parameters provided by the user;

obtaining, by the service provider, a set of temporary session parameters and a temporary key;

transmitting, by the service provider, a notification to initiate a captive environment for the new user registration, wherein the notification comprises the set of temporary session parameters and the temporary key;

receiving, by the user device, the notification to initiate the captive environment for the new user registration;

establishing the captive environment between the user device and the service provider via the set of temporary session parameters and the temporary key;

receiving, by the user device, a set of permanent user profile parameters via the captive environment; and storing, at the user device, the set of permanent user profile parameters in a user profile module.

2. The method as claimed in claim 1, wherein the user device comprises:

a network selection engine to enable selection from a set of available networks; and a first time user request module configured to store the set of first time user registration parameters.

3. The method as claimed in claim 1, wherein the first time registration parameters comprises at least a registration-IMSI.

4. The method as claimed in claim 3, wherein the registration-IMSI is characterized to be identified as a new user registration parameter by the service provider.

5. The method as claimed in claim 1, wherein an authentication engine operatively coupled to the service provider transmits a set of captive session initiation parameters to the user device.

6. The method as claimed in claim 1, wherein a set of authentication parameters are generated using one or more captive session initiation parameters.

7. The method as claimed in claim 1, wherein a home location register is configured to transmit the authentication parameters to a mobile switching center (MSC).

8. The method as claimed in claim 1, wherein a mobile switching center (MSC) is configured to transmit a temporary user profile to the user device.

9. The method as claimed in claim 1, wherein communication between the user device and the service provider is carried over one of a radio channel and a data channel.

10. The method as claimed in claim 6, wherein the captive environment is established over a secure channel between the user device and the service provider.

11. The method as claimed in claim 1, wherein user profile information is stored upon successful validation of the set of first time registration parameters.

12. The method as claimed in claim 1, wherein user device comprises at least one selected from the group consisting of: a virtual SIM module, an e-SIM module and a conventional SIM module.

13. A system of authentication and over-the-air (OTA) registration of a new user without a subscriber identity module (SIM) card, comprising:

a user device configured to:
transmit a set of first time registration parameters to a selected service provider;
receive a notification to initiate a captive environment for the new user registration, wherein the notification comprises a set of temporary session parameters, a temporary key, and authentication triplets;
establish the captive environment with the service provider via the set of temporary session parameters, the temporary key, and the authentication triplets; and
receive a set of permanent user profile parameters via the captive environment;

the service provider configured to:
receive the set of temporary session parameters, the temporary key, and the authentication triplets;
validate a set of registration parameters provided by the user; and
transmit the notification to initiate a captive environment for the new user registration; and an authentication center configured to:
allocate the set of temporary session parameters and the temporary session key;
generate the authentication triplets; and
transmit the set of temporary session parameters, the temporary session key to the service provider, and the authentication triplets; and the user device further configured to store the set of permanent user profile parameters in a user profile module.

14. The system as claimed in claim 13, wherein the user device comprises:

a network selection engine to enable selection from a set of available networks; and a first time user request module configured to store the set of first time user registration parameters.

15. The system as claimed in claim 13, wherein the authentication center is operatively coupled to the service provider and transmits a set of captive session initiation parameters to the user device.

16. The system as claimed in claim 13, further comprising a home location register that comprises a database configured to store the first time registration parameters.

17. The system as claimed in claim 16, wherein the home location register is configured to transmit the authentication parameters to a mobile switching center (MSC).

18. The system as claimed in claim 17, wherein the mobile switching center (MSC) is configured to transmit a temporary user profile to the user device.

19. The system as claimed in claim 13, wherein communication between the user device and the service provider is carried over one of a radio channel and a data channel.

20. The system as claimed in claim 18, wherein the captive environment is established over a secure channel between the user device and the service provider.

21. The system as claimed in claim 13, wherein user device comprises at least one selected from the group consisting of: a virtual SIM module, an e-SIM module and a conventional SIM module.

22. One or more non-transitory computer-readable storage media storing computer-executable instructions for causing a computing system to perform a method for registration of a new user, the method comprising:

receiving a set of first time registration parameters;
validating the set of first time registration parameters;
obtaining a set of temporary session parameters and a temporary key;
transmitting a notification to initiate a captive environment for the new user registration, wherein the notification comprises the set of temporary session parameters and the temporary key;
establishing a connection with the captive environment based on the set of temporary session parameters and the temporary key;
obtaining a set of permanent user profile parameters;
transmitting the set of permanent user profile parameters via the captive environment; and
establishing a connection based on the set of permanent user profile parameters in place of the connection with the captive environment based on the set of temporary session parameters and the temporary key.

* * * * *